(12) United States Patent
DiRisio

(10) Patent No.: US 6,192,195 B1
(45) Date of Patent: Feb. 20, 2001

(54) CAMERA WITH COMBINATION ANTI-BACK PAWL AND WINDOW FOR EXPOSURE COUNTER

(75) Inventor: Anthony DiRisio, Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/534,379

(22) Filed: Mar. 24, 2000

(51) Int. Cl.⁷ .............................. G03B 17/02; G03B 17/36
(52) U.S. Cl. ................... 396/6; 396/284; 396/411
(58) Field of Search .................... 396/6, 284, 396, 396/411

(56) References Cited

U.S. PATENT DOCUMENTS

| | | |
|---|---|---|
| 3,057,277 | 10/1962 | Swarofsky et al. . |
| 3,590,711 | 7/1971 | Milanese et al. . |
| 4,057,814 | 11/1977 | Grunbacher et al. . |
| 4,655,573 | 4/1987 | Harvey et al. . |
| 4,707,096 | 11/1987 | Lawther . |
| 5,005,035 | 4/1991 | Pagano . |
| 6,014,525 | 1/2000 | Ohkura et al. . |
| 6,078,754 * | 6/2000 | DiRisio ..................................... 396/6 |

* cited by examiner

Primary Examiner—David M. Gray
(74) Attorney, Agent, or Firm—Roger A. Fields

(57) ABSTRACT

A camera includes an exposure counter wheel that has a series of exposure count indicia and is incrementally rotated in a count direction to successively view the exposure count indicia, and an anti-backup pawl that engages with the exposure counter wheel to prevent rotation of the exposure counter wheel in a reverse direction which is the opposite of the count direction. The anti-backup pawl is a combination single-piece unit having a stationary rigid transparent portion fixed in place above the exposure counter wheel to permit the exposure count indicia to be successively seen through the transparent portion when the exposure counter wheel is incrementally rotated in the count direction, and having a resilient flexible pawl portion positioned in engagement with the exposure counter wheel to prevent rotation of the exposure counter wheel in the reverse direction but to allow rotation of the exposure count wheel in the count direction.

9 Claims, 5 Drawing Sheets

CAMERA WITH COMBINATION ANTI-BACK PAWL AND WINDOW FOR EXPOSURE COUNTER

FIELD OF THE INVENTION

The invention relates generally to the field of photography, and in particular to cameras. More specifically, the invention relates to a camera with a combination anti-backup pawl and viewing window for an exposure counter.

BACKGROUND OF THE INVENTION

Film and cameras that are all in one, commonly referred to as disposable, single-use or one-time-use cameras, have become well known. The one-time-use camera is a simple point-and-shoot type camera comprising an opaque plastic main body part that supports a conventional film cartridge in a cartridge receiving chamber, an unexposed film roll pre-wound from the film cartridge onto a film supply spool in a film supply chamber, a fixed-focus taking lens, a film metering mechanism with a rotatably supported metering sprocket that engages the filmstrip, a manually rotatable film winding thumbwheel rotatably engaged with a film take-up spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the said exposure counter wheel to prevent its reverse rotation, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film take-up spool inside the film cartridge. This winds an exposed frame of the filmstrip from a rear backframe opening in the main body part into the film cartridge and advances an unexposed frame of the filmstrip from the unexposed film roll to the rear backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the latent images and make prints for the customer.

PROBLEM

It is a continuing challenge to make one-time-use cameras as compact as is reasonably possible. This pursuit often involves the elimination of at least one part whenever possible. For example, U.S. Pat. No. 6,014,525 issued Jan. 11, 2000 discloses a camera having a combination shutter release button and viewing window for an exposure counter wheel.

SUMMARY OF THE INVENTION

A camera comprising an exposure counter wheel that has a series of exposure count indicia and is incrementally rotated in a count direction to successively view the exposure count indicia, and an anti-backup pawl that engages with the exposure counter wheel to prevent rotation of the exposure counter wheel in a reverse direction which is the opposite of the count direction, is characterized in that:

the anti-backup pawl is a combination single-piece unit having a stationary rigid transparent portion fixed in place above the exposure counter wheel to permit the exposure count indicia to be successively seen through the transparent portion when the exposure counter wheel is incrementally rotated in the count direction and having a resilient flexible pawl portion positioned in engagement with the exposure counter wheel to prevent rotation of the exposure counter wheel in the reverse direction but to allow rotation of the exposure count wheel in the count direction.

DETAILED DESCRIPTION OF THE INVENTION

The invention is disclosed as being embodied preferably in a onetime-use or disposable camera. Because the features of a one-time-use or disposable camera are generally known, the description which follows is directed in particular only to those elements forming part of or cooperating directly with the disclosed embodiment. It is to be understood, however, that other elements may take various forms known to a person of ordinary skill in the art.

Figure 1:
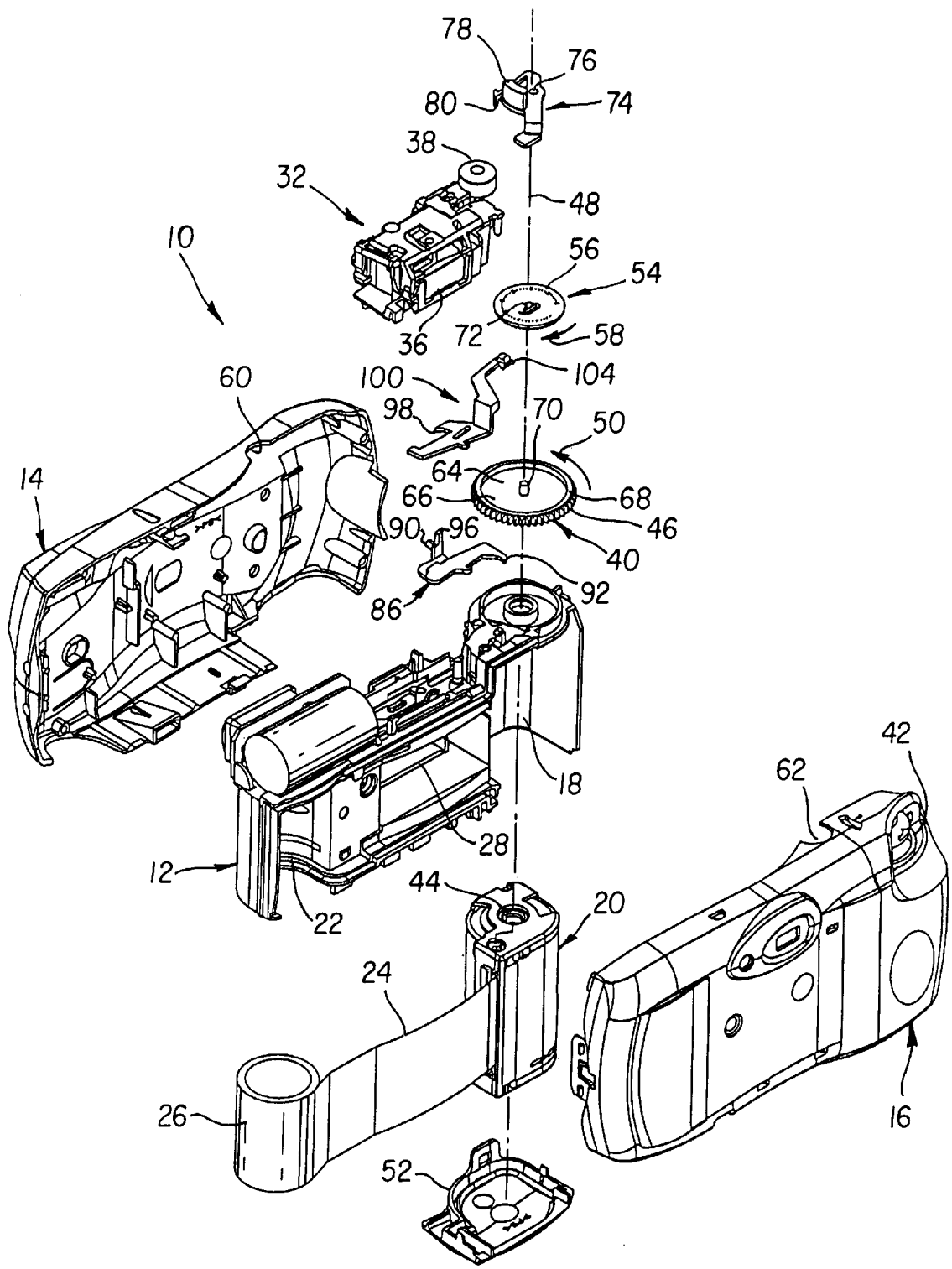
FIG. 1 is an exploded rear perspective view of a one-time-use camera with a combination anti-backup pawl and viewing window for an exposure counter according to a preferred embodiment of the invention.
Figure 2:
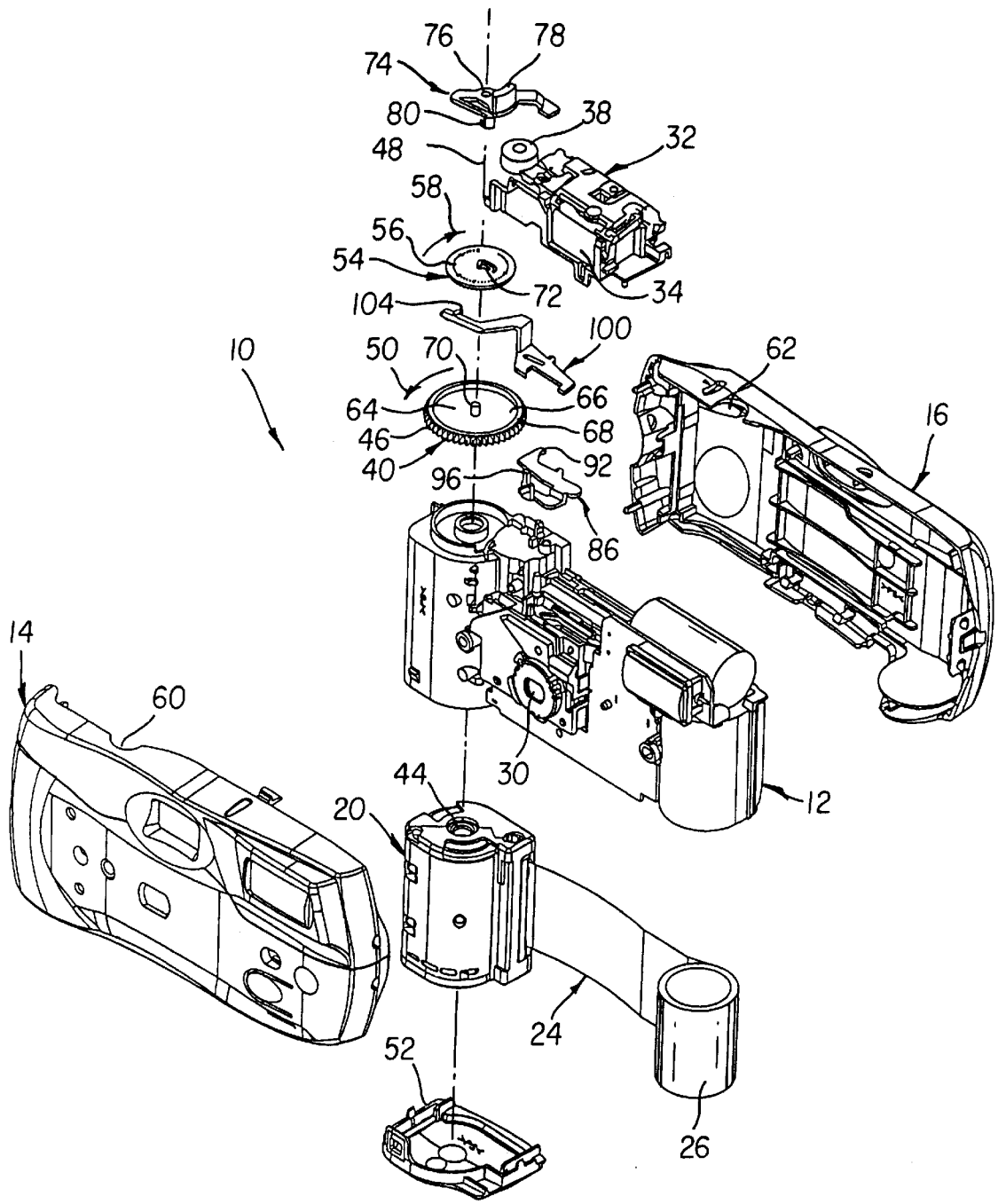
FIG. 2 is an exploded front perspective view of the camera.

Referring now to the drawings, FIGS. 1 and 2 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply chamber 22. See FIGS. 1 and 2. During manufacture, a filmstrip 24 is prewound from the film cartridge 20 into an unexposed film roll 26 which is placed in the film supply chamber 22. A rearwardly open backframe opening 28 is located between the cartridge receiving chamber 18 and the film supply chamber 22 for exposing successive frames of the filmstrip 24 when ambient light is received through a front taking lens 30 on the main body part 12.

A known optical viewfinder 32 has a pair of front and rear viewfinder lenses 34 and 36 for viewing a subject to be photographed, and supports a shutter release button 38 that is manually depressed to initiate picture-taking.

A film winding thumbwheel 40, rotatably supported on the main body part 12, above the cartridge receiving chamber 18, radially protrudes partially from an elongate narrow opening 42 in the rear cover part 16 and has a depending coaxial stem, not shown, in coaxial engagement with an exposed top end 44 of a film take-up spool inside the film cartridge 20. The film winding thumbwheel 40 has a continuous alternating series of peripheral-edge symmetrical teeth 46 that are arranged in a circle concentric about an axis 48 of the thumbwheel. The teeth 46 readily permit the thumbwheel 40 to be manually grasped or fingered to incrementally rotate the thumbwheel in a film winding direction 50, i.e. counter-clockwise in FIGS. 1 and 2, about the axis 48, to similarly rotate the film take-up spool inside the film cartridge 20. This is done in order to wind an exposed frame of the filmstrip 24 from the backframe opening 28 into the film cartridge 20 after each film exposure, and to move a fresh frame of the filmstrip from the unexposed film roll 26 to the backframe opening. Each time the filmstrip 24 is advanced slightly greater than a frame width, one of the teeth 46 are engaged to prevent rotation of the thumbwheel 40.

When the filmstrip 24 is wound completely into the film cartridge 20, a bottom cover-door 52 for the cartridge receiving chamber 18 is disengaged from the main body part 12 to permit the film cartridge to be removed from the cartridge receiving chamber.

An exposure counter wheel 54 has a known circular series of exposure count indicia 56 and is incrementally rotated in a count direction 58, i.e. clockwise in FIGS. 1–5, about the axis 48 to successively view the exposure count indicia through a top pair of half-circle openings 60 and 62 in the front and rear cover parts 14 and 16. The exposure counter wheel 54 resides in a top central cavity 64 in the film winding thumbwheel 40, leaving a ring-shaped space 66 between the exposure counter wheel and a perimeter rim 68 of the exposure counter wheel. The thumbwheel 40 has an integral upstanding center spindle 70 that rotates with the thumbwheel. The center spindle 70 longitudinally extends from the central cavity 64 through a center bearing hole 72 in the exposure counter wheel 54 to support the exposure counter wheel for rotation in the central cavity relative to the thumbwheel 40.

An anti-backup pawl 74 is held fast (stationary) by engagement with the front and rear cover parts 14 and 16 and has a bearing opening 76 that receives the center spindle 70 to allow the center spindle to rotate relative to the anti-backup pawl. The anti-backup pawl 74 is a combination single-piece unit having a stationary rigid transparent image-magnifying portion 78 fixed in place above the exposure counter wheel 54 to permit the exposure count indicia 56 to be successively seen through the transparent portion when the exposure counter wheel is incrementally rotated in the count direction 58, and having a resilient flexible pawl portion 80 positioned in engagement with the exposure counter wheel to prevent rotation of the exposure counter wheel in a reverse direction 82 which is the opposite of the count direction. The pawl portion 80 depends into ring-shaped space 66 at the central cavity 64 to engage with the exposure counter wheel 54 at any one of a circular series of bottom ratchet teeth 84 on the exposure counter wheel.

OPERATION

Figure 3:
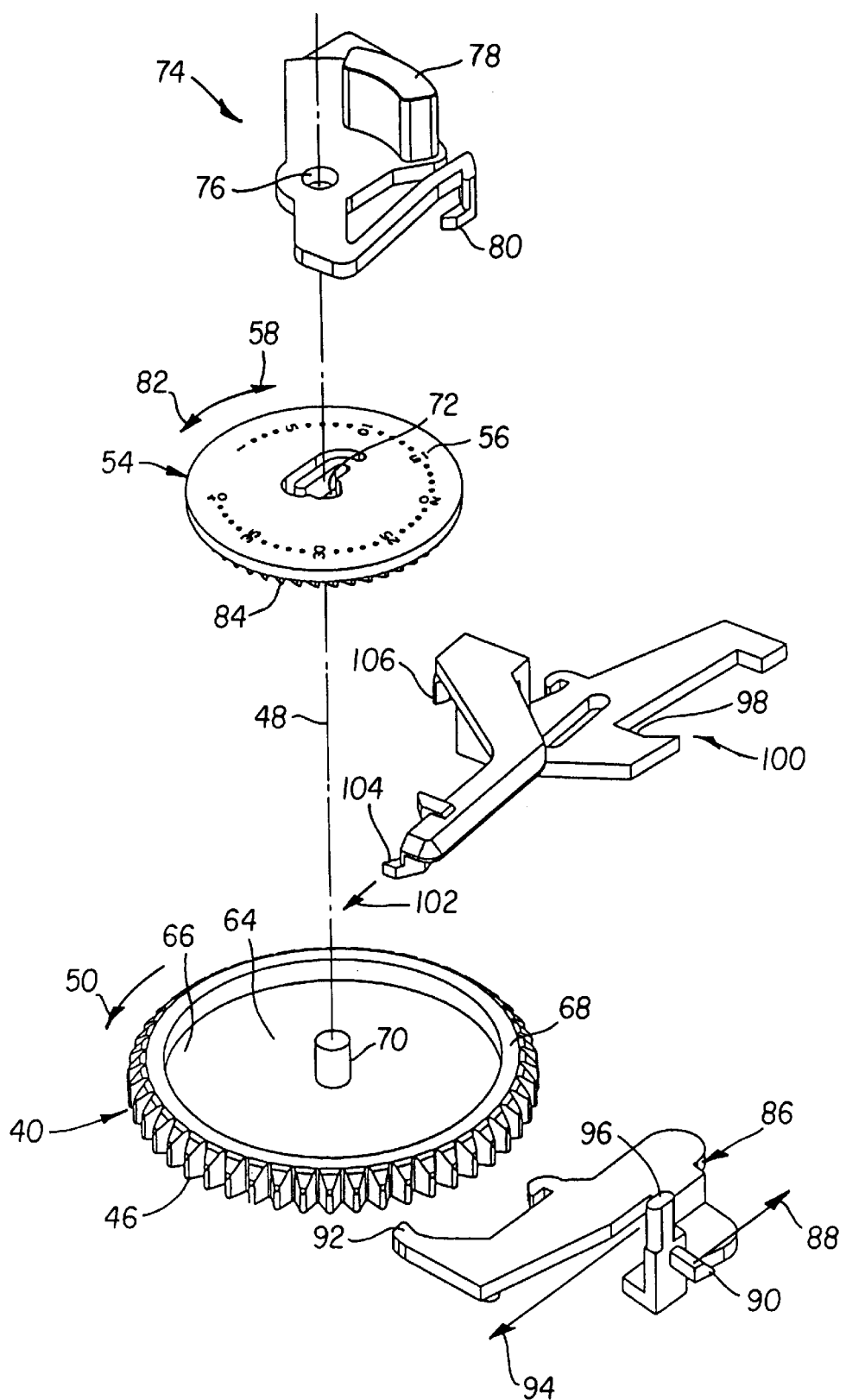
FIG. 3 is an exploded front perspective view of the combination anti-backup pawl and viewing window for the exposure counter.
Figure 4:
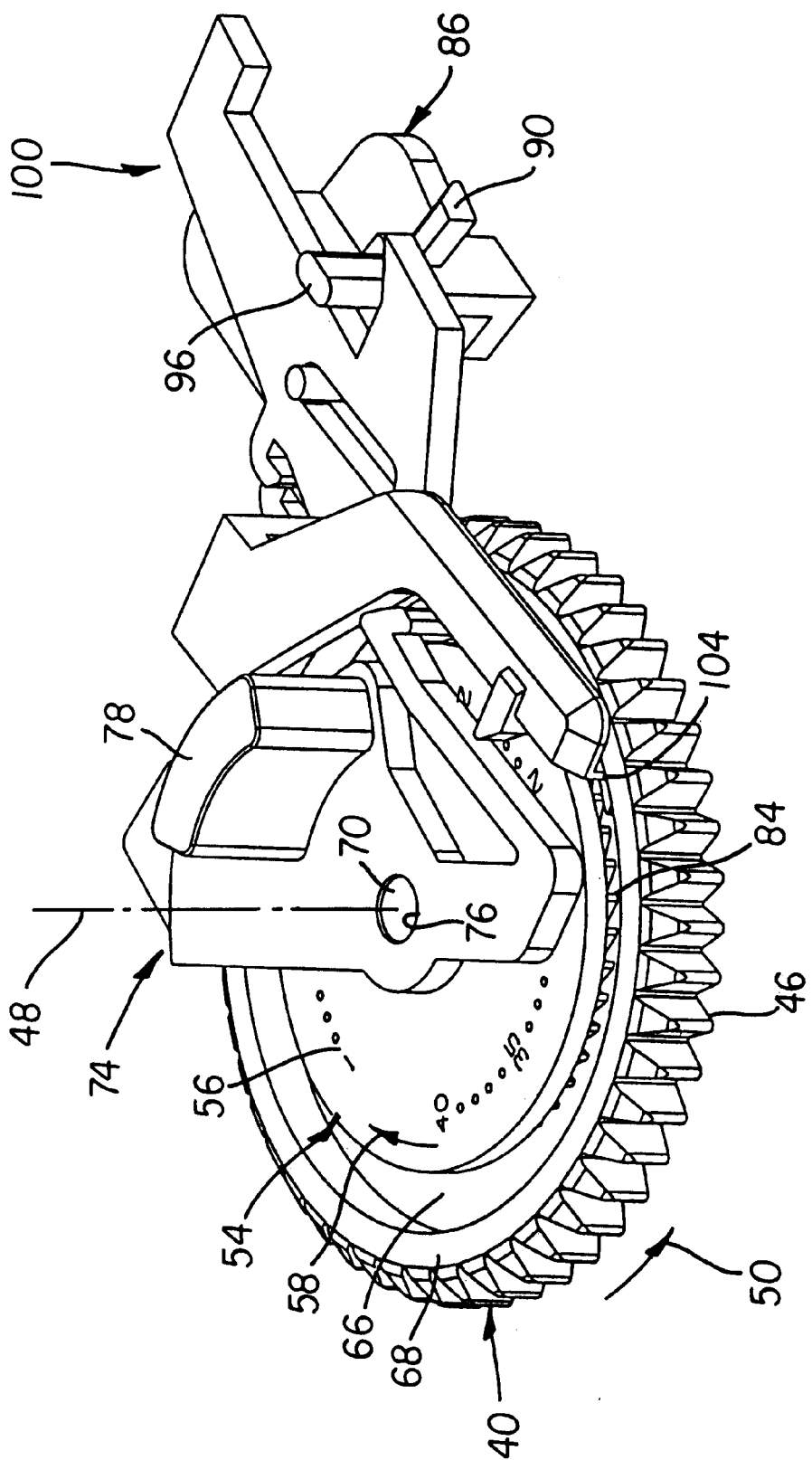
FIGS. 4 and 5 are assembled front perspective views of the combination anti-backup pawl and viewing window for the exposure counter as seen from two different angles.
Figure 5:
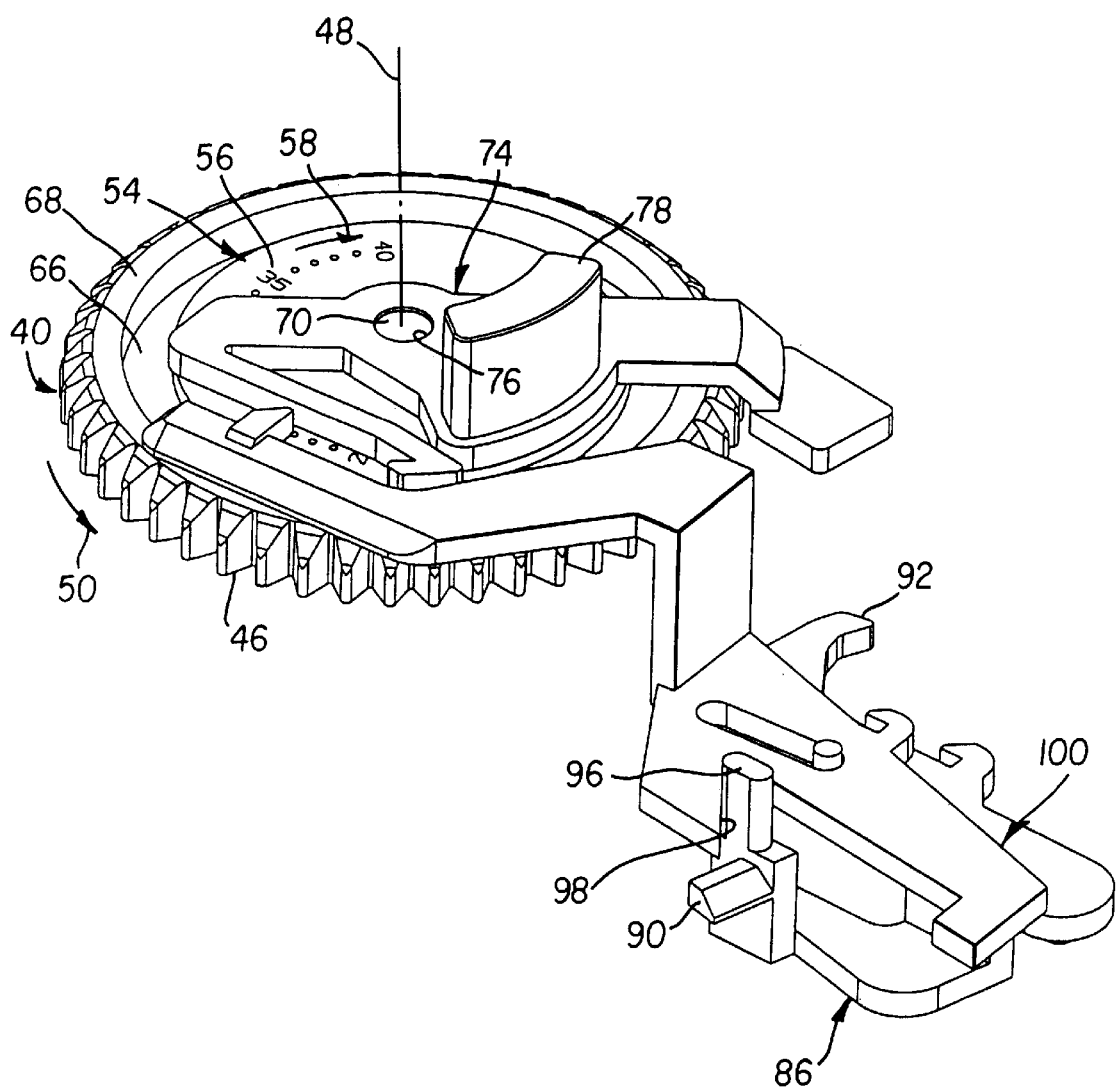

When the shutter release button 38 is manually depressed to take a picture, a first multi-function element 86 movably supported on the main body part 12 is released to be spring-actuated substantially to the right as indicated by an arrow 88 in FIG. 3. A shutter actuator 90 on the first multi-function element 88 then pivots a shutter blade, not shown, momentarily open to allow ambient light to be received through the front taking lens 30 to expose a film frame at the backframe opening 28 in the main body part 12.

After the film exposure, the film winding thumbwheel 40 is manually grasped at its teeth 46 to begin to rotate the thumbwheel in the film winding direction 50, i.e. counter-clockwise in FIG. 3, about the axis 48, to similarly rotate the film take-up spool inside the film cartridge 20. This winds the exposed frame of the filmstrip 24 from the backframe opening 28 into the film cartridge 20 and moves a fresh frame of the filmstrip from the unexposed film roll 26 to the backframe opening.

As the filmstrip 24 is advanced, a film metering pawl 92 on the first multi-function element 86 engages the filmstrip at any one of successive edge perforations, not shown, in the filmstrip to return the first multi-function element 86 substantially to the left as indicated by an arrow 94 in FIG. 3. A drive post 96 on the first multi-function element 86 simultaneously pushes against an edge 98 on a second multi-function element 100 movably supported on the main body part 12 to move the second multi-function element substantially to the left as indicated by an arrow 102 in FIG. 3. A drive pawl 104 on the second multi-function element 100 then engages any one of the ratchet teeth 84 on the exposure counter wheel 54 to rotate the exposure counter wheel in the count direction 58, i.e. clockwise in FIG. 3, about the axis 48. This changes whichever one of the exposure count indicia 56 on the exposure counter wheel 54 that can be seen through the top pair of half-circle openings 60 and 62 in the front and rear cover parts 14 and 16 to the next lower indicia, i.e. to decrement the exposure counter wheel by "1".

Final movement of the second multi-function element 100 substantially to the left as indicated by the arrow 102 in FIG. 3, returns a locking lug 106 on the second multi-function element into engagement with any one of the teeth 46 on the film winding thumbwheel 40 to prevent rotation of the thumbwheel.

The filmstrip 24 has now been advanced slightly greater than a frame width and is said to be "metered", i.e. a fresh frame of the filmstrip is at the backframe opening 28 and the thumbwheel 40 is prevented from being rotated.

The invention has been described with reference to a preferred embodiment. However, it will be appreciated that variations and modifications can be effected by a person of ordinary skill in the art without departing from the scope of the invention.

PARTS LIST 10. camera
12. main body part
14. front cover part
16. rear cover part
18. cartridge receiving chamber
20. film cartridge
22. film supply chamber 24. filmstrip
26. unexposed film roll
28. backframe opening
30. front taking lens
32. optical viewfinder
34. front viewfinder lens
36. rear viewfinder lens
38. shutter release button
40. film winding thumbwheel
42. narrow opening
44. top spool end
46. teeth
48. axis
50. film winding direction
52. bottom cover-door
54. exposure counter wheel
56. exposure count indicia
58. count direction
60. half-circle opening
62. half-circle opening
64. central cavity
66. ring-shaped space
68. rim
70. center spindle
72. center bearing hole
74. anti-backup pawl
76. bearing opening
78. transparent image-magnifying portion
80. pawl portion
82. reverse direction
84. ratchet teeth
86. first multi-function element
88. arrow
90. shutter actuator
92. film metering pawl
94. arrow
96. drive post
98. edge
100. second multi-function element
102. arrow
104. drive pawl
106. locking lug

What is claimed is:

1. A camera comprising an exposure counter wheel that has a series of exposure count indicia and is incrementally rotated in a count direction to successively view said exposure count indicia, and an anti-backup pawl that engages with said exposure counter wheel to prevent rotation of said exposure counter wheel in a reverse direction which is the opposite of the count direction, is characterized in that:

said anti-backup pawl is a combination single-piece unit having a stationary rigid transparent portion fixed in place above said exposure counter wheel to permit said exposure count indicia to be successively seen through said transparent portion when said exposure counter wheel is incrementally rotated in the count direction and having a resilient flexible pawl portion positioned in engagement with said exposure counter wheel to prevent rotation of said exposure counter wheel in the reverse direction but to allow rotation of said exposure count wheel in the count direction.

2. A camera as recited in claim 1, wherein a film winding thumbwheel is rotatable to advance a filmstrip and has a central cavity, and said film counter wheel resides in said central cavity.

3. A camera as recited in claim 2, wherein said pawl portion of said anti-backup pawl depends into said central cavity in said film winding thumbwheel to engage with said exposure counter wheel to prevent rotation of said exposure counter wheel in the reverse direction.

4. A camera as recited in claim 2, wherein said exposure counter wheel has a center bearing hole, and said film winding thumbwheel has an upstanding center spindle that longitudinally extends from said central cavity into said center bearing hole to support said exposure counter wheel for rotation in said central cavity relative to said film winding thumbwheel.

5. A camera as recited in claim 4, wherein said anti-backup pawl has a bearing opening, and said center spindle of said film winding thumbwheel longitudinally extends into said bearing opening.

6. A camera as recited in claim 4, wherein said transparent portion of said anti-backup pawl is an image magnifier.

7. A camera comprising a film winding thumbwheel that is rotatable to advance a filmstrip after each film exposure, and an exposure counter wheel that has a series of exposure count indicia and is incrementally rotated to successively view said exposure count indicia, is characterized in that:

said thumbwheel has a central cavity and a center spindle projecting from said central cavity; and said exposure counter wheel resides in said central cavity and has a center bearing hole that receives said center spindle to support said exposure counter wheel for rotation in said central cavity relative to said thumbwheel.

8. A camera comprising a film winding thumbwheel that is rotatable to advance a filmstrip after each film exposure, an exposure counter wheel that has a series of exposure count indicia and is incrementally rotated in a count direction to successively view said exposure count indicia, and an anti-backup pawl that engages with said exposure counter wheel to prevent rotation of said exposure counter wheel in a reverse direction which is the opposite of the count direction, is characterized in that:

said thumbwheel has a central cavity and a center spindle projecting from said central cavity;

said exposure counter wheel resides in said central cavity and has a center bearing hole that receives said center spindle to support said exposure counter wheel for rotation in said central cavity relative to said thumbwheel; and said anti-backup pawl protrudes into said central cavity to engage with said exposure counter wheel to prevent rotation of said exposure counter wheel in the reverse direction.

9. A camera as recited in claim 8, wherein said anti-backup pawl has a bearing opening, and said center spindle of said film winding thumbwheel longitudinally extends into said bearing opening.

* * * * *